United States Patent
Fanning et al.

(10) Patent No.: US 9,875,090 B2
(45) Date of Patent: Jan. 23, 2018

(54) PROGRAM ANALYSIS BASED ON PROGRAM DESCRIPTORS

(71) Applicant: Microsoft Corporation, Redmond, WA (US)

(72) Inventors: Michael C. Fanning, Redmond, WA (US); Frederico Mameri, Seattle, WA (US); Christopher M. H. Faucon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/721,031

(22) Filed: Dec. 20, 2012

(65) Prior Publication Data

US 2014/0181792 A1    Jun. 26, 2014

(51) Int. Cl.
G06F 9/445    (2006.01)
G06F 9/44    (2006.01)

(52) U.S. Cl.
CPC . *G06F 8/60* (2013.01); *G06F 8/10* (2013.01)

(58) Field of Classification Search
CPC ........ G06F 8/75; G06F 11/323; G06F 11/362; G06F 11/3604; G06F 11/3624; G06F 11/3664
USPC .................................................. 717/125-126
See application file for complete search history.

(56) References Cited

U.S. PATENT DOCUMENTS

| | | | |
|---|---|---|---|
| 5,812,122 A * | 9/1998 | Ng | G06F 11/3664 714/E11.208 |
| 6,311,327 B1 * | 10/2001 | O'Brien | G06F 11/3466 714/35 |
| 6,820,256 B2 | 11/2004 | Fleehart et al. | |
| 7,219,338 B2 | 5/2007 | Venter | |
| 8,813,046 B2 * | 8/2014 | Nair | G06F 8/51 345/467 |
| 8,869,120 B2 * | 10/2014 | Huuck | G06F 8/43 717/104 |
| 2005/0097082 A1 * | 5/2005 | Yan | 707/3 |
| 2006/0048099 A1 * | 3/2006 | Templin et al. | 717/124 |
| 2006/0123412 A1 * | 6/2006 | Hunt | G06F 8/61 717/174 |
| 2006/0248519 A1 * | 11/2006 | Jaeger | G06F 11/3604 717/141 |
| 2009/0019430 A1 | 1/2009 | Jaeger et al. | |
| 2011/0016460 A1 | 1/2011 | Archambault et al. | |

(Continued)

FOREIGN PATENT DOCUMENTS

WO    2014/100563    6/2014

OTHER PUBLICATIONS

Almossawi et al., "Analysis Tool Evaluation: Coverity Prevent", Carnegie Mellon University, 2006, 19pg.*

(Continued)

*Primary Examiner* — Ryan Coyer
(74) *Attorney, Agent, or Firm* — Cooper Legal Group, LLC

(57) ABSTRACT

A deployment package descriptor may be obtained. One or more application files that include application content in a plurality of different data formats may be obtained. An analysis of the application content included in the obtained one or more application files may be initiated, based on a plurality of different data formats and descriptive information associated with the obtained application files, the descriptive information included in the obtained deployment package descriptor.

20 Claims, 14 Drawing Sheets

(56) References Cited

U.S. PATENT DOCUMENTS

| | | | | |
|---|---|---|---|---|
| 2011/0167410 | A1* | 7/2011 | Huuck | G06F 8/43 717/124 |
| 2011/0258619 | A1* | 10/2011 | Wookey | G06F 8/68 717/175 |
| 2011/0302655 | A1* | 12/2011 | Tikkanen et al. | 726/24 |

OTHER PUBLICATIONS

Evans et al., "Improving Security Using Extensible Lightweight Static Analysis", IEEE, 2002, 10pg.*

Gomes et al., "An overview on the Static Code Analysis approach in Software Development", Faculdade de Engenharia da Universidade do Porto, Portugal, 2009, 16pg.*

Deruelle, et al., "Analysis and Manipulation of Distributed Multi-Language Software Code", Retrieved Oct. 23, 2012 at <<http://ieeexplore.ieee.org/stamp/stamp.jsp?tp=&arnumber=972665>>, First IEEE International Workshop on Source Code Analysis and Manipulation (SCAM), Nov. 10, 2001, pp. 12.

Mayer, et al., "Cross-Language Code Analysis and Refactoring", Retrieved Oct. 23, 2012 at <<http://www.pst.ifi.lmu.de/~mayer/papers/2012_09_23_SCAM2012_CrossLanguage.pdf>>, IEEE 12th International Working Conference on Source Code Analysis and Manipulation (SCAM), Sep. 23-24, 2012, pp. 94-103.

Strein, et al., "Cross-Language Program Analysis and Refactoring", Retrieved Oct. 23, 2012 at <<http://ieeexplore.ieee.org/stamp/stamp.jsp?tp=&arnumber=4026870>>, In Proceedings of the Sixth IEEE International Workshop on Source Code Analysis and Manipulation (SCAM'06), Sep. 2006, pp. 207-216.

Kullbach, et al., "Program Comprehension in Multi-Language Systems", Retrieved Oct. 23, 2012 at <<http://ieeexplore.ieee.org/stamp/stamp.jsp?tp=&arnumber=723183>>, Proceedings of the Working Conference on Reverse Engineering (WCRE'98), 1998, pp. 135-143.

"International Search Report & Written Opinion for PCT Patent Application No. PCT/US2013/076862", dated Apr. 16, 2014, Filed Date: Dec. 20, 2013, 11 Pages.

"International Search Report & Written Opinion" for PCT Patent Application No. PCT/US2013/076862, inventors Fanning et al., entitled "Program Analysis Based on Program Descriptors," dated Apr. 16, 2014, Filed Date: Dec. 20, 2013, 11 Pages.

* cited by examiner

Error List

0 Errors   2 Warnings   558 messages

| Description | File | Line | Col | Project |
|---|---|---|---|---|
| JS2015: Place opening brace of control blocks on the same line as the conditional statement keyword. | win8ui.js | 28 | 10 | TestApp |
| JS2016: Place 'else' keyword on the same line as the closing brace of the previous control block. | win8ui.js | 78 | 75-79 | TestApp |
| JS2016: Place 'else' keyword on the same line as the closing brace of the previous control block. | win8ui.js | 3488 | 42-46 | TestApp |
| JS2016: Place 'else' keyword on the same line as the closing brace of the previous control block. | win8ui.js | 6090 | 42-46 | TestApp |
| JS2016: Place 'else' keyword on the same line as the closing brace of the previous control block. | win8ui.js | 6095 | 42-46 | TestApp |
| JS2021: All binary and ternary operators (with the exception of the ',' operator) should be separated from operands with spaces. | win8ui.js | 30 | 54 | TestApp |
| JS2021: All binary and ternary operators (with the exception of the ',' operator) should be separated from operands with spaces. | win8ui.js | 30 | 64 | TestApp |
| JS2025: Insert a space before comment text. If this block is commented code, use '////' to open the comment line. | win8ui.js | 123 | 154 | TestApp |

FIG. 2

PROGRAM ANALYSIS BASED ON PROGRAM DESCRIPTORS

BACKGROUND

Program analysis has been an area of interest for many years. For example, programs may be authored in multiple languages, may be significantly distributed, and/or may depend significantly on dynamic code execution. Current computing runtime environments may support package-based application deployment, in which applications may involve multiple different data formats and/or languages.

SUMMARY

According to one general aspect, a system may include a program analysis engine that includes a program acquisition component configured to obtain a program that is described based on a description in a manifest. The program analysis engine may include a program analysis component configured to initiate an analysis of the program based on application descriptive information included in the manifest. A results component may be configured to provide results of the analysis.

According to another aspect, a set of one or more application files may be obtained. A descriptor file that includes descriptive information describing the obtained set of one or more application files may be obtained. An analysis session may be generated, via a device processor, based on the descriptive information. A multi-pass analysis of application content included in the obtained set of application files may be initiated, via the analysis session.

According to another aspect, a computer program product tangibly embodied on a computer-readable storage medium may include executable code that may cause at least one data processing apparatus to obtain a deployment package descriptor. Further, the data processing apparatus may obtain one or more application files that include application content in a plurality of different data formats. Further, the data processing apparatus may initiate an analysis of the application content included in the obtained one or more application files, based on a plurality of different data formats and descriptive information associated with the obtained one or more application files, the descriptive information included in the obtained deployment package descriptor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 2 illustrates an example user interface output of an analysis result.

DETAILED DESCRIPTION

I. Introduction

Figure 1:
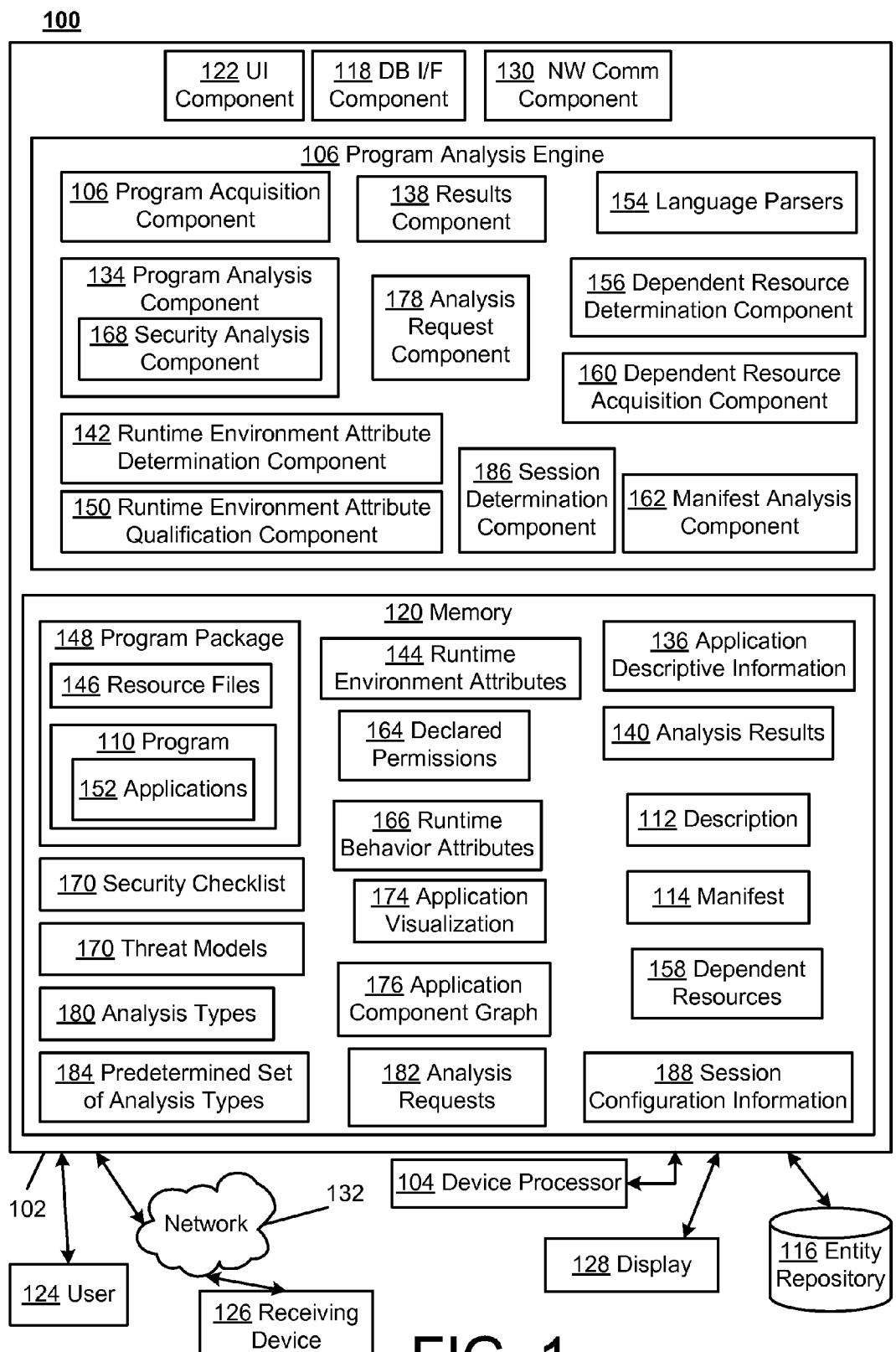
FIG. 1 is a block diagram illustrating of an example system for program analysis based on program descriptors.

Performing whole program analysis for applications may involve attempting analysis on programs that may be authored in multiple languages and/or data formats, that may be highly distributed, and/or that may depend significantly on dynamic code execution. As discussed further herein, for runtime environments that provide for package-based application deployment, it may be possible to determine an understanding of a particular application as it runs in a single locale, its components, its dependencies, etc. For example, this understanding may be possible due to the factoring of the application's deployment package (and/or installation conventions) as well as the existence of a manifest/other descriptive file that documents runtime and/or other aspects of the program. In accordance with example techniques discussed herein, an example analysis tool may construct and execute a whole program static analysis for one or more supported languages within such a runtime environment.

For example, a program analysis may be performed locally to a user/developer device, or it may be performed as an online service (e.g., at the request of a user/developer of a program package that includes a manifest or descriptive file that documents runtime and/or other aspects of the program). For example, the analysis may be performed in accordance with default analysis types specified, or the user/developer may specify a customized set of analysis types for obtained desired analysis results.

For example, a deployment package (e.g., a MICROSOFT WINDOWS 8 package) or deployment directory may include one or more applications bundled together. For example, a deployment package may be received as a stream across a network, and may be parsed substantially entirely in memory, in accordance with example techniques discussed herein. For example, an individual application might declare "contracts" or other specific modes of execution (e.g., receiving shared data, initiating background tasks, etc.), that may be separated and analyzed in a distinct phase by an example technique. For example, the complete package/deployment directory may be scanned in order to perform a cross-language analysis.

For example, an analysis may be qualified by locale (e.g., by aggregating or excluding package resource files or data based on the locale associated with them, e.g., in a resources binary file). For example, a resource file may include localized strings (e.g., both "dog" and "chien"), or it may point to an external file which includes a localized graphic for an English or French system.

For example, multiple language parsers may be integrated in an analysis in order to combine analysis (e.g., for JavaScript (JS)/Cascading Style Sheets (CSS)/HyperText Markup Language5 (HTML5)/MICROSOFT INTERMEDIATE LANGUAGE (MSIL)/WINMD/native object code), in a multi-pass analysis.

Example analysis techniques discussed herein may include retrieval of dependent resources (both from web or dependent packages) and/or retrieving relevant analysis information specific to these individual dependencies from the network and/or other storage medium sources.

Example analysis techniques discussed herein may include scanning of manifest/descriptive files in order to determine declared permissions and/or other aspects of a package that may be relevant to runtime behaviors.

Example analysis techniques discussed herein may include correctness analysis, computation of framework use (as a distinct result or as part of an analysis of whether declared permissions/capabilities are acceptably specified with application use). Such techniques may also include generation of security checklists and/or threat models based on whole program analysis. Additionally, example analysis techniques discussed herein may provide application visualizations and/or component graphs.

Example analysis techniques discussed herein may include analyses based on enforcement of style and/or coding convention guidelines.

Further, example techniques discussed herein may include extraction and indexing of terms, source code, and application attributes (e.g., determinations of which files may be obfuscated or not), in support of generating a searchable store of a body of applications.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for analyzing programs based on program descriptors. As shown in FIG. 1, a system 100 may include a device 102 that includes at least one processor 104. The device 102 may include a program analysis engine 106 that may include a program acquisition component 108 that may be configured to obtain a program 110 that is described based on a description 112 in a manifest 114.

According to an example embodiment, the program analysis engine 106, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 104 is depicted as external to the program analysis engine 106 in FIG. 1, one skilled in the art of data processing will appreciate that the device processor 104 may be implemented as a single component, and/or as distributed units which may be located internally or externally to the program analysis engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

According to an example embodiment, the program analysis engine 106 may be implemented in association with one or more user devices. For example, the program analysis engine 106 may communicate with a server, as discussed further below.

For example, an entity repository 116 may include one or more databases, and may be accessed via a database interface component 118. One skilled in the art of data processing will appreciate that there are many techniques for storing repository information discussed herein, such as various types of database configurations (e.g., relational databases, hierarchical databases, distributed databases) and non-database configurations.

According to an example embodiment, the program analysis engine 106 may include a memory 120 that may store the program 110 (e.g., or a representation thereof). In this context, a "memory" may include a single memory device or multiple memory devices configured to store data and/or instructions. Further, the memory 120 may span multiple distributed storage devices.

According to an example embodiment, a user interface component 122 may manage communications between a user 124 and the program analysis engine 106. The user 124 may be associated with a receiving device 126 that may be associated with a display 128 and other input/output devices. For example, the display 128 may be configured to communicate with the receiving device 126, via internal device bus communications, or via at least one network connection.

According to example embodiments, the display 128 may be implemented as a flat screen display, a print form of display, a two-dimensional display, a three-dimensional display, a static display, a moving display, sensory displays such as tactile output, audio output, and any other form of output for communicating with a user (e.g., the user 124).

According to an example embodiment, the program analysis engine 106 may include a network communication component 130 that may manage network communication between the program analysis engine 106 and other entities that may communicate with the program analysis engine 106 via at least one network 132. For example, the network 132 may include at least one of the Internet, at least one wireless network, or at least one wired network. For example, the network 132 may include a cellular network, a radio network, or any type of network that may support transmission of data for the program analysis engine 106. For example, the network communication component 130 may manage network communications between the program analysis engine 106 and the receiving device 126. For example, the network communication component 130 may manage network communication between the user interface component 122 and the receiving device 126.

A program analysis component 134 may be configured initiate an analysis of the program 110 based on application descriptive information 136 included in the manifest 114. A results component 138 may be configured to provide results 140 of the analysis.

For example, the program analysis engine 106 may receive a body of session/analysis configuration and a reference that resolves to one or more deployment packages. For example, for each deployment package, its associated "manifest" (e.g., a file that includes descriptive details that may describe the application, its entry points, limits on or changes to its runtime behaviors, etc.) may be parsed. In this context, the manifest may include details such as properties that identify the one or more applications described by the manifest, as well as its publisher (the originating company or developer). The manifest may also include information regarding hardware and/or other prerequisites and dependencies (e.g., other external code that is used by and/or exercised by application code included in the package, as well as limits on processor architecture, etc., in order to run the packaged code).

Further, manifest content may include information regarding kinds of file types that may be opened/processed by the applications. Further, manifest content may include runtime and device capabilities that may govern runtime permissions (e.g., an ability to start a webcam or microphone, an ability to access user disk locations such as the documents or pictures storage location, etc.).

Further, manifest content may include activation information for reusable packaged components. Additionally, the manifest content may include visual preferences (e.g., rotation preferences for tablets/other devices), contrast, etc.

For example, for each analysis unit (e.g., a program or a unit of program execution such as all code associated with a sharing contract), a multi-pass analysis may be performed. For example, in the first pass, code constructs may be visited and provided to configured analysis extensions along with a mechanism that permits storing of persisted information in a thread-safe manner. For example, this phase may provide for construction of a global understanding of data that may span multiple constructs (e.g., HTML pages, JavaScript functions, etc.), which may subsequently be utilized when performing a follow-on analysis.

For example, a runtime environment attribute determination component 142 may be configured to determine one or more runtime environment attributes 144 associated with resource files 146 included in a program package 148 that includes the program 110. For example, the runtime environment attributes 144 may be descriptive of application runtime conditions. For example, the application runtime conditions may include one or more of a locale, screen orientation, contrast mode, other monitor settings, etc.

For example, a runtime environment attribute qualification component 150 may be configured to qualify the analysis of the program 110 based on one or more of aggregating at least a portion of the resource files 146 based on the determined one or more runtime environment attributes 144, or excluding at least a portion of the resource files 146 based on the determined one or more runtime environment attributes 144. For example, the qualification may also be based on embedded resources (e.g., strings). For example, such a concept of restricting/excluding a subset of the variant matrix may apply not only to resources files and locales, but to any program descriptor (e.g., entry point, high contrast only, etc.).

For example, the program analysis component 134 may be configured to initiate the analysis of the program 110 based on the application descriptive information 136 included in the manifest 114 and parsing one or more applications 152 included in the program 110 via one or more language parsers 154.

For example, package files may be inspected and types may be identified, for example, via file extension/sniffing/parsing in a first pass. For example, on parsing the package manifest 114, application data related to the runtime behavior of an application (such as its declared permissions, its external dependencies, etc.) may be retrieved. For example, on encountering an application's embedded resource files, a range of supported locales may be determined and a map of locales to indicated supporting package files may be generated. For example, "sniffing" a file may include running special code that examines the file to determine its data format.

For example, file types may be detected from descriptive details in the manifest. Thus, example techniques discussed herein may generate a "guess" about a file, based on one or more of a descriptor file indicating what the file is, making a "guess" based on the file name (e.g., its extension), or the actual file may be parsed to attempt a determination based on its contents.

For example, on encountering a code container, a relevant binary/language parser may be instantiated and used to determine and order file dependencies. For example, a graph representation of the program running in one or more specified locales may be generated from this information. For example, an analysis of these graphs and respectively implied package conditions may be performed.

For example, a binary parser may be used for non-code containers. For example, it may be determined that a graphic is associated with high contrast mode, per the manifest, but on subsequent analysis of the image, it may be determined that the image is a graphical type that may not render acceptably in high contrast mode.

As another example, the manifest may point to a graphic that renders as a "tile" in the operating system (OS) that is known to be of a fixed dimension. For example, the graphic associated with this declarative information may be analyzed and a warning may be fired if the actual dimensions of the graphic suggest that it may not render acceptably (e.g., due to size mismatch/potential scaling problems).

According to an example embodiment, a follow-on analysis that spans multiple language parsers (e.g., JavaScript (JS)/HTML/CSS/IL) may be performed against the program graphs, e.g., in reverse topological order.

For example, a dependent resource determination component 156 may be configured to determine dependent resources 158 associated with the program 110 based on one or more of a portion of the analysis of the program 110, or an analysis of the manifest 114. For example, these dependencies may be determined in order to complete a "whole program" analysis. In accordance with another aspect, the analysis may have models/summary information at hand (e.g., based on a past analysis of these dependencies, or based on hand-authored information) to support an analysis.

For example, a dependent resource acquisition component 160 may be configured to obtain information associated with the determined dependent resources 158.

For example, a manifest analysis component 162 may be configured to determine one or more of one or more attributes associated with runtime conditions associated with the program, or one or more attributes associated with runtime execution conditions. For example, the attributes associated with runtime conditions associated with the program may include attributes indicating potential activities associated with an application at runtime (e.g., receive a share notification, attempt to access a web cam). For example, the attributes associated with runtime execution conditions may include attributes indicating potential runtime states of the operating system or the runtime environment (e.g., landscape mode, high contrast, etc.).

For example, declared permissions 164 and one or more attributes 166 associated with runtime behaviors associated with the program 110 may be determined.

The program analysis engine 106 may receive a set of inputs/configuration details that may indicate separate aspects of an intended analysis. Examples of states may include (but are not limited to) input specifiers such as fully-qualified file names, paths to directories, specifiers with wild-cards that resolve to one or more files/directories, Uniform Resource Identifiers (URIs), etc.

Additional examples of states may include settings that may specify any arbitrary behavior that may occur during analysis (such as enabling/disabling specific checks, altering behavior of a general pipeline, altering/configuring the behavior of any individual rule or check that contributes to the analysis), output specifiers that may indicate target files and/or other destinations for receiving output.

Further examples of states may include settings that may enable late-binding/instantiation of plug-ins for checks, plug-ins for enabling custom loggers, and other useful dependency injections.

Additional examples of states may include inputs that may represent collections of these settings (e.g., project files, response files, etc.) and which may, for example, receive the results of analysis. For example, the settings may themselves be bundled in individual files (e.g., Extensible Markup Language (XML), text (TXT), etc.) and may be aggregated in order to construct and configure an analysis session. Furthermore, one or more of these files may themselves receive the results of the analysis. In this context, a "project file" may refer to an XML or otherwise structured document that includes elements specifying both the settings of an analysis as well as the results returned. In this context, a "response file" may refer to an external file that itself includes a command-line. For example, such a technique may be used to overcome limits on the amount of information that may be specified on the command-line itself.

For example, these inputs may resolve to a set of analysis targets, which may be referred to herein as "deployment packages." In this context, "deployment package" may refer to a conceptual unit that may include a descriptor file (e.g., a manifest) and a set of files. The file list may be explicit (e.g., a distinct file that lists relevant files) or implicit (e.g., a set of files that exist alongside and in child directories of a parent directory that includes a manifest/descriptor file). For example, the manifest may include qualifying information relevant to code that is included within the package.

For example, the qualifying information may include a package name/identity, version information, and/or metadata relevant to a presentation of the package and/or its applications. For example, in a context such as an application store, the manifest may include a text description of the application and/or marketing images that may be presented to prospective purchasers.

For example, the qualifying information may include indicators indicating a set of languages for which the included application(s) have been localized.

For example, the qualifying information may include example prerequisites for installing/running the included applications, such as an indication of a minimum operating system, etc.

For example, the qualifying information may include indicators indicating dependencies which may involve installation and/or availability in order to run the included applications, such as C runtime libraries or other redistributable code that may be called into (e.g., referenced) by package code.

For example, the qualifying information may include runtime capabilities which may be granted for the application to run (e.g., the absence of which may limit program function). For example, a package may declare that it may request access to a microphone in order to function, or may make requests to the internet.

For example, the qualifying information may include descriptions of late-binding mechanisms and/or extension hosting details. For example, the manifest 114 may include information relevant to component instantiation mechanisms (e.g., COM) where there is not a direct coupling between application code and instantiated components.

For example, the qualifying information may include information related to digital certificates, digital rights management, etc. that may be used by the program analysis engine 106 to verify runtime security.

For example, having resolved a set of packages for analysis, the program analysis engine 106 may further identify one or more distinct applications that are described within the manifest (as discussed above). For example, a deployment package may include the following kinds of programs that may provide a user desire for distinct analyses:

(1) Hypertext Markup Language (HTML) entry points with supporting JavaScript code;
(2) Native or managed execution entry points; and/or
(3) Loose declarative user interface (UI) files, such as Extensible Application Markup Language (XAML) files, files with file extension .XAP, .CS, etc., that may be transformed/compiled into executable code by the runtime environment.

For example, the application data may be associated with manifest-described information that may be relevant to analysis. For example, runtime-relevant and analysis-relevant information that may be described in the manifest may include:

(1) An identifier for the application;
(2) An entry point of the program, as above (e.g., an executable (exe), a hosted dynamic link library (dll), an HTML start page, XAML/XAP or other declarative/transformed program representation, etc.);
(3) Domain/URIs matching rules that restrict the ability of code to communication with internet/networked resources;
(4) File extensions associated with applications (e.g., indicating that an application may open Portable Document Format (PDF), text (TXT), etc., files);
(5) Metadata that may be relevant to sharing sources/targets (e.g., an application may indicate that it may publish an image for sharing, or that it may receive a shared word processing document);
(6) Settings indicating whether the application may open or save files to the system 100, and of what kind;

(7) Settings indicating whether the application is permitted to auto-play content/devices (e.g., initiate automatic rendering of video, playback of sound, etc.);

(8) Settings indicating whether the application may participate in background task operations, or receive special notifications from the system (e.g., notifications indicating that the system is being locked or powered down); and/or (9) Information indicating contracts such as search and share (e.g., that may communicate with a broker).

For example, having resolved a set of distinct applications within a package, the program analysis engine 106 may further identify one or more runtime variants of the application. For example, the program analysis engine 106 may determine that the target application has been localized to English and French versions, and includes resources indicating the application is tuned for low video resolution systems, high contrast display, etc. As another example, the application may be tuned for landscape or portrait mode (e.g., as runtime conditions).

For example, having resolved a set of runtime variants of an application, the program analysis engine 106 may generate a file list, including supporting global information which represents the set of analysis targets for an application variant. For example, the file list may be generated based on one or more of multiple example techniques: (1) the complete list of files within the package may be provided, (2) a list of files associated with an application (as defined by an entry point for execution) may be available, and/or (3) the list of requested files may be discovered in a first pass that performs a dependency analysis. For example, in order to complete a dependency analysis, the system may perform file sniffing/parser selection (e.g., as discussed further herein). A managed entry point, for example, may result in the selection of a passive IL parser in order to scan the application entry point in order to identify other managed assemblies that the application may depend on (e.g., leading to further analysis of these dependencies in order to identify their dependencies, until a complete closure of requested code is generated).

For example, as an alternative technique, the program analysis engine 106 may generate a comprehensive list of files specified in the package, and pass this to a single analysis entry point, along with other details that describe other specifics obtained from the manifest (e.g., the list of entry points, the list of supported languages, the list of runtime qualifiers such as high contrast mode, low video resolution, etc.).

Analysis may be initiated. For example, each file may be sniffed to identify its content (e.g., DLL, exe, JS file, graphic, etc.), or this information may already be available, based on information in the manifest/descriptor file. For example, a relevant parser/analyzer for that file type may be retrieved and the file may be passed to it. For example, the file-specific parser/analyzer may have access to context that provides global configuration/state that has been determined so far, and may also provide a storage location for new results/state that may be determined by the file-specific analyzer. This context may also provide functional capabilities (e.g., a logging facility that allows the file-specific analyzer to generate analysis messages, log internal diagnostic messages, etc.). Examples of parsers/analyzers that may be utilized may include the following:

(1) Managed intermediate language (IL) inspectors
(2) Native object code decompilers
(3) HTML/CSS/JavaScript parsers
(4) Graphics readers
(5) PDF/Documents/spreadsheets/txt files
(6) Zip files, and other compressed binary data One skilled in the art of data processing will understand that these analyzers are not restricted to code inspection; neither is analysis restricted to the literal code/dependencies which may be determined from an analysis of code. For example, the program analysis engine 106 may parse graphics, PDFs, etc., and other content.

For example, having identified a list of files of interest and a set of associated analyzers, the analysis may proceed in a potentially ordered manner. A web application analysis, for example, may be configured in such a way that the JavaScript code is processed in the same order as it would be executed (e.g., which may permit certain classes of correctness analysis).

For example, each of these techniques may be repeated for each level of the analysis. Thus, analyses may be performed on each package specified, each application specified in the package(s), each application variant (or bundle of variants), etc. For example, each "level" of this analysis may be a multi-pass analysis. Thus, for example, a complete pass may be performed against all elements at a current stage and then again in one or more additional passes. Such an analysis may thus enable one pass to collect global state about all members of the current set, which may subsequently be used in a follow-on analysis to accomplish some goal. A first pass against a set of source files, for example, may identify all call sites within that code. For example, a subsequent analysis against all functions in the set of source files may perform a "dead code" analysis, firing for any functions that are analyzed for which no call site has been detected in a previous pass.

For example, the program analysis component 134 may be configured to initiate the analysis of the program 110 based on initiating an analysis of one or more of correctness of the application descriptive information 136 included in the manifest 114, correctness of content of one or more applications 152 included in the program 110, or usage attributes associated with a computational framework for execution of the program 110.

For example, the program analysis component 134 may include a security analysis component 168 configured to determine, based on the analysis of the program 110, one or more of a security checklist 170, or one or more threat models 172.

For example, the program analysis component 134 may be configured to determine, based on the analysis of the program 110, one or more of a visualization of contents of the manifest, an application visualization 174 of one or more applications 152 included in the program 110, or an application component graph 176 associated with the one or more applications 152. For example, the program analysis component 134 may determine a visualization representing the analysis session, or a portion thereof. For example, a resource under analysis may be displayed, or rendered (e.g., a graphic, sound, or video file). For example, the program analysis component 134 may determine an application visualization, or an abstract syntax representation (AST) of a constituent file.

For example, an analysis request component 178 may be configured to determine one or more analysis types 180 for the analysis of the program 110, based on one or more of one or more analysis requests 182 received from a user, or a predetermined set of analysis types 184.

For example, a session determination component 186 may be configured to obtain session configuration information 188 and generate an analysis session based on the session configuration information 188 and the application descriptive information 136 included in the manifest 114.

For example, the session determination component 186 may inspect available analysis checks and rationalize these with user configuration details in order to determine a set of reports and/or analysis checks that are enabled. Further, session configuration may be inspected to determine analysis behaviors related to processing applications. For example, a user might specify an analysis that includes the "EN-US" locale only, an analysis against the "search" behaviors of all specified applications only, or for analysis to assume that the code is executing in a high contrast mode. For example, a user may request a spell-check of character string resources (e.g., in different languages).

For example, a set of specified wildcards, fully-qualified references to files, etc., may be resolved to determine a list of analysis targets. For example, one or more analysis results "sinks" may be constructed to receive messages generated during code inspection.

For example, the session determination component 186 may be configured to obtain the session configuration information 188 based on one or more of one or more input file names, one or more paths to one or more directories, wildcard specifiers that resolve to one or more file names or directory names, Uniform Resource Identifiers (URIs), settings associated with behavior occurring during execution of the analysis session, output specifiers indicating target destinations for analysis output, settings that enable late binding, settings that enable instantiation of plug-ins for checks, or settings that enable instantiation of plug-ins for enabling custom loggers.

For example, the program analysis component 134 may be configured to initiate the analysis of the program 110 based on extraction and indexing of terms, source code, and application attributes associated with applications included in the program 110.

For example, the program analysis component 134 may be configured to initiate the analysis of the program 110 based on initiating transmission of a request to an online service to analyze the program 110 based on the application descriptive information 136 included in the manifest 114. For example, the program analysis component 134 (in this context) may be located on a user device.

FIG. 2 illustrates an example user interface output of an analysis result 140. FIG. 2 illustrates an example of analysis results based on enforcement of style and/or coding convention guidelines. As shown in FIG. 2, a display area 202 includes a display of an "error List" 204 resulting from a requested analysis of a package. Columns indicated as "Description," File," Line," "Col.," and "Project" are displayed to provide a user with a visualization 206 of messages generated by a parser, based on parsing a JavaScript application.

Figure 3:
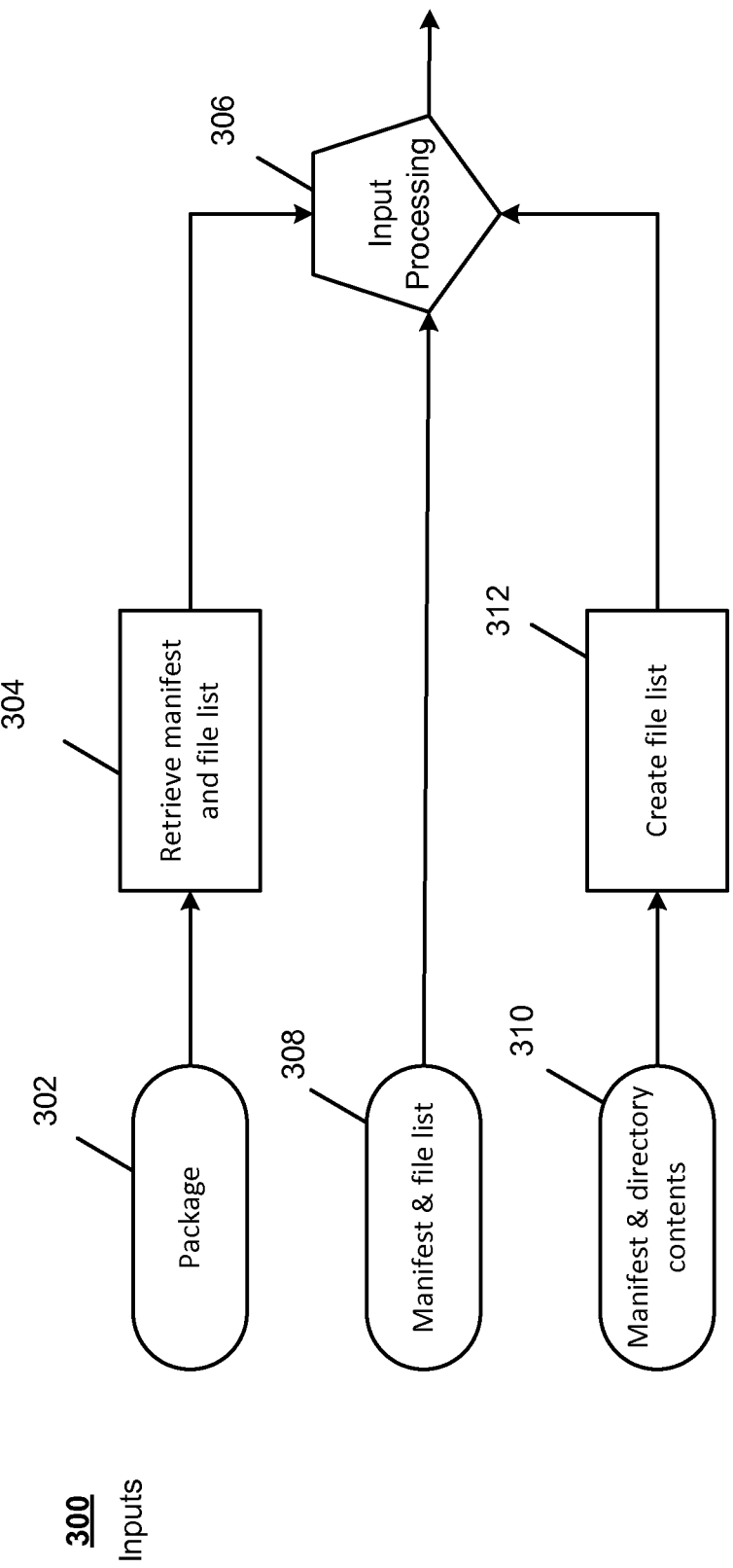
FIG. 3 is a block diagram illustrating an example flow associated with the example system of FIG. 1.

FIG. 3 is a block diagram illustrating an example flow associated with the example system of FIG. 1. As shown in FIG. 3, an example flow 300 may provide example inputs for the example system of FIG. 1. For example, a package 302 is input, and a manifest and file list are retrieved at 304. These items are then passed to input processing at 306. In accordance with another aspect, a manifest and file list are input at 308, and are passed to input processing at 306. In accordance with another aspect, a manifest and directory contents are input at 308, and are passed to input processing (e.g., as in FIG. 4 below) at 306.

Figure 4:
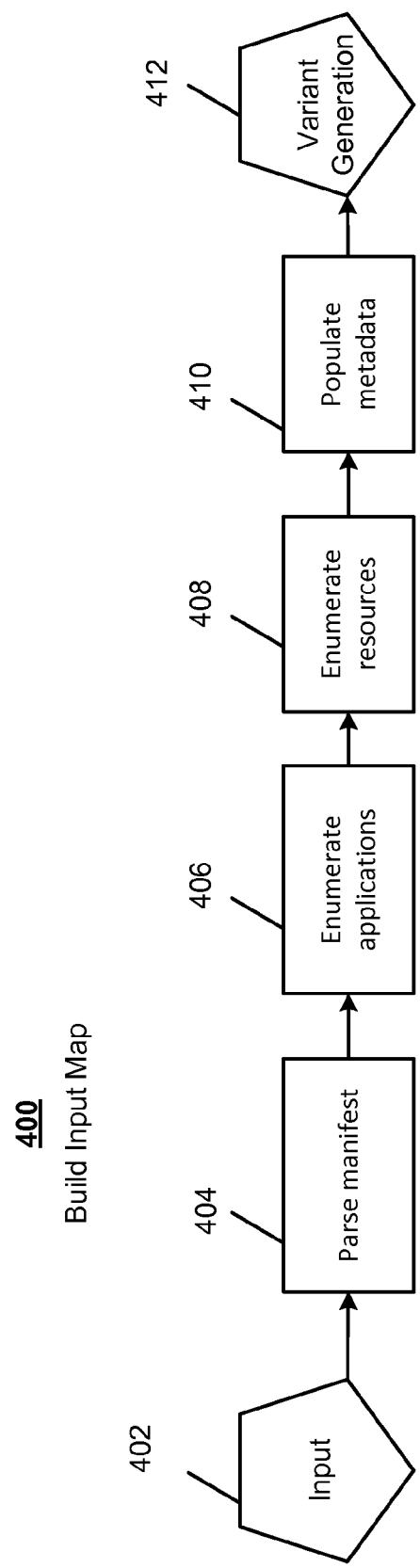
FIG. 4 is a block diagram illustrating an example flow associated with the example system of FIG. 1.

FIG. 4 is a block diagram illustrating an example flow associated with the example system of FIG. 1. As shown in FIG. 4, an example flow 400 may provide example input maps for the example system of FIG. 1. For example, an input is received at 402, and a manifest (e.g., the manifest 114 of FIG. 1) is parsed at 404. Applications are enumerated at 406, (e.g., the applications 152 of FIG. 1), and resources are enumerated at 408.

At 410, the system populates metadata, and control is passed to variant generation (e.g., as in FIG. 5 below) at 412.

Figure 5:
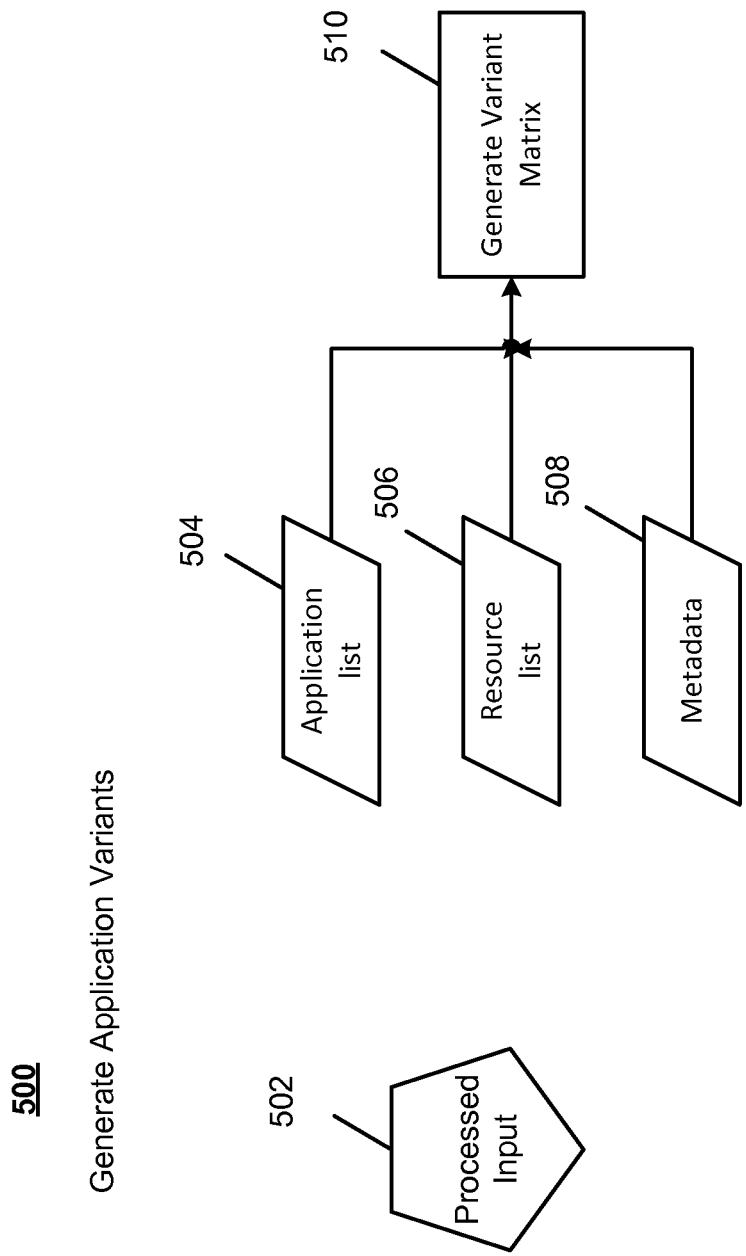
FIG. 5 is a block diagram illustrating an example flow associated with the example system of FIG. 1.

FIG. 5 is a block diagram illustrating an example flow associated with the example system of FIG. 1. As shown in FIG. 5, an example flow 500 may generate application variants for the example system of FIG. 1. For example, processed input (e.g., from FIG. 4 above) may be input at 502. For example, the application list (504) the resource list (506), and the metadata (508) from FIG. 4 processing, may be used to generate a variant matrix at 510.

Figure 6:
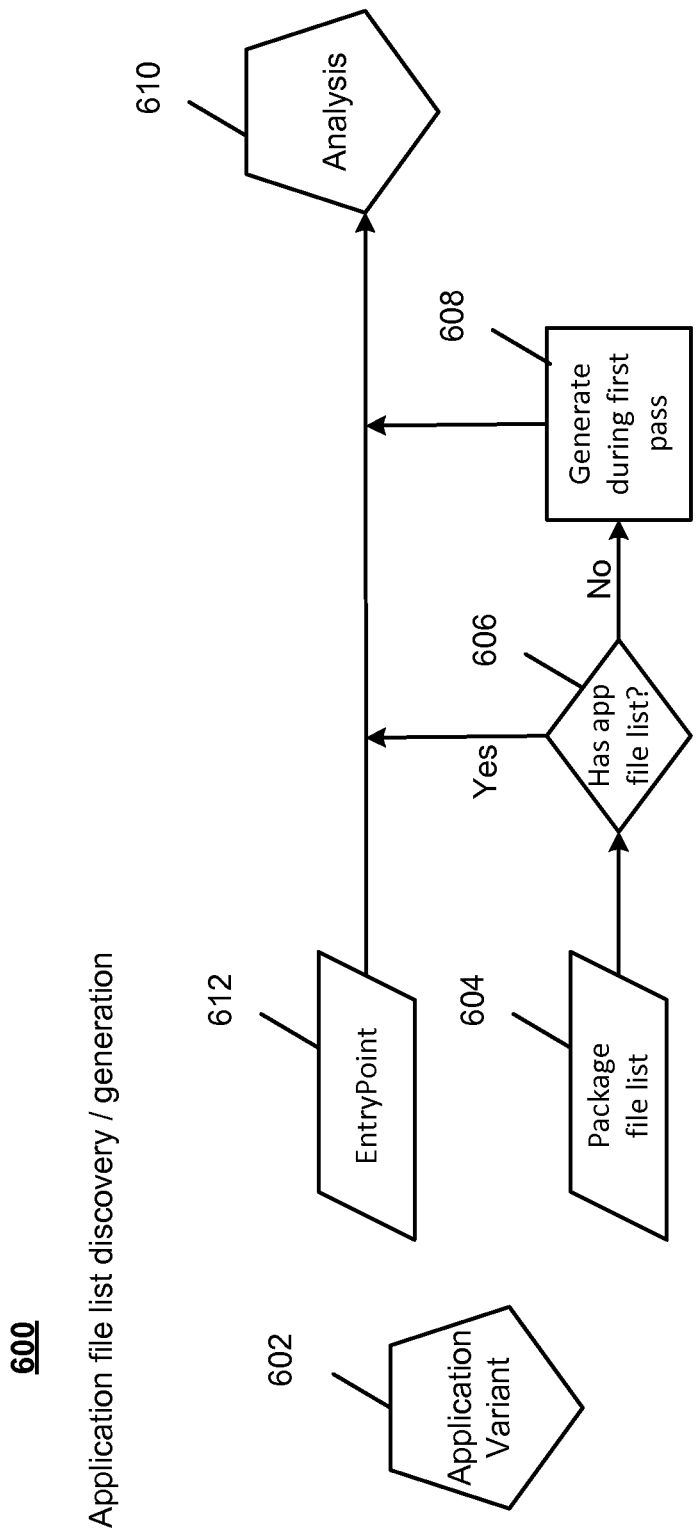
FIG. 6 is a block diagram illustrating an example flow associated with the example system of FIG. 1.

FIG. 6 is a block diagram illustrating an example flow associated with the example system of FIG. 1. As shown in FIG. 6, an example flow 600 may provide application file list discovery/generation. For example, an application variant 602 is received (e.g., from the processing of FIG. 5 above). A package file list 604 is reviewed. A determination is made as to whether the package includes an application file list at 606. If not, an application file list is generated during a first pass at 608. If yes, the control passes to analysis at 610.

An entry point is analyzed at 612, and control passes to analysis at 610.

Figure 7:
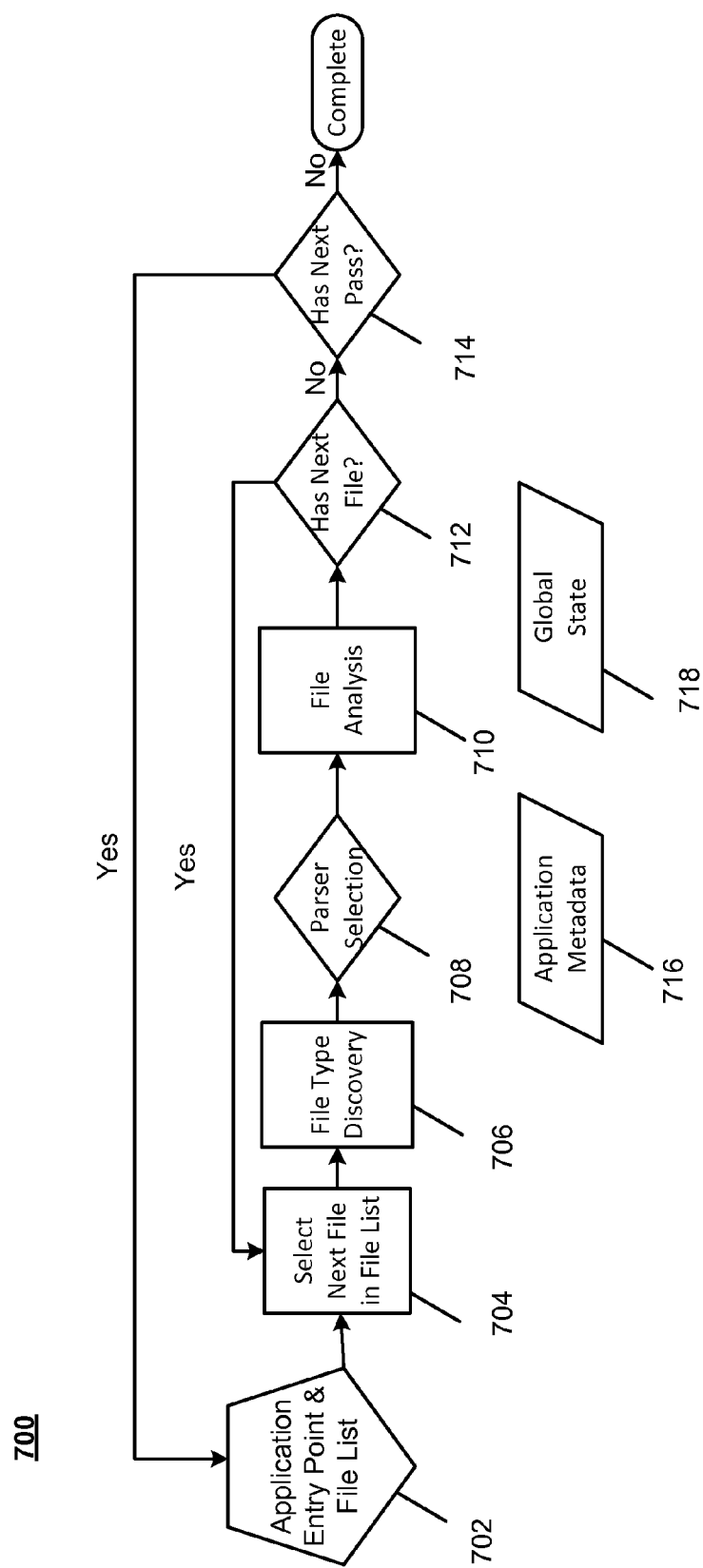
FIG. 7 is a block diagram illustrating an example flow associated with the example system of FIG. 1.

FIG. 7 is a block diagram illustrating an example flow associated with the example system of FIG. 1. As shown in FIG. 7, an example flow 700 may process an application and entry point file list. For example, at 702, an application and entry point file list are received. At 704, a "next" file in the file list is selected, and file type discovery is performed at 706. Parser selection is performed at 708, and file analysis is performed at 710.

At 702, it is determined whether there is a "next" file. If yes, then control is passed back to 702. If no, then it is determined whether there is a "next" pass. If yes, then control is passed back to 702. If no, then control is passed back to a caller. As shown in FIG. 7, application metadata 716 and global state 718 may also be involved in the processing.

Figure 8:
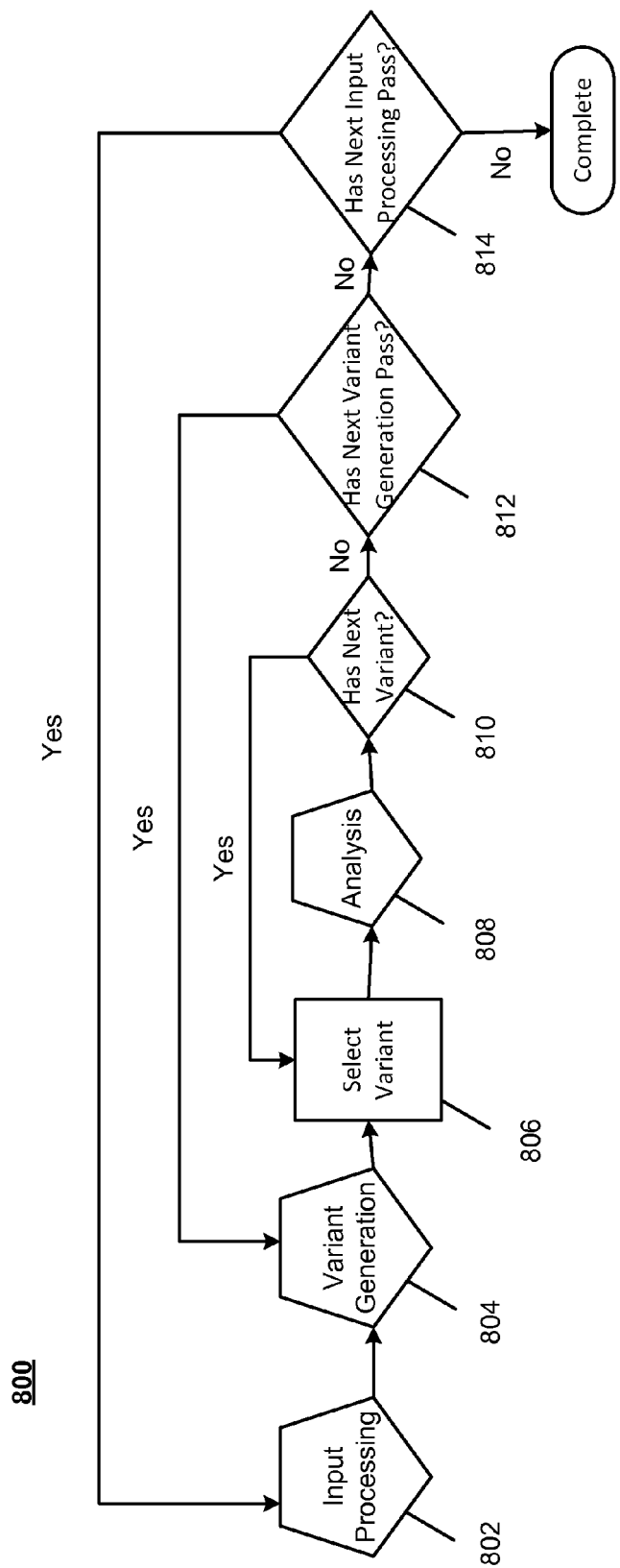
FIG. 8 is a block diagram illustrating an example flow associated with the example system of FIG. 1.

FIG. 8 is a block diagram illustrating an example flow associated with the example system of FIG. 1. As shown in FIG. 8, an example flow 800 may process information received from input processing (e.g., from FIG. 4 above) at 802, and variant generation (e.g., from FIG. 5 above) at 804. At 808, a variant is selected, and analysis is performed at 808. At 810, it is determined whether there is a "next" variant. If yes, then control is passed back to 806 for processing of a next variant. If no, then it is determined whether there is a "next" variant generation pass. If yes, then control is passed back to 804 for a next variant generation.

If no, then it is determined whether there is a "next" input processing pass. If yes, then control is passed back to 802 for a next input processing pass. If no, then control is passed back to a caller.

In accordance with example techniques discussed herein, there may be an analysis performed that is relevant to the package level, in which the correctness/suitability of the deployment data may be verified. In accordance with another aspect, there may be an analysis performed that is application-driven, in the example system of FIG. 1 may attempt to construct a session for one specific entry point described in the manifest.

In accordance with another aspect, there may be an "application variant" analysis performed, in which manifest-resident information that describes possible various runtime states (e.g., operating system (OS) locale, video settings, etc.) may be inspected, and then an application-level analysis may be performed, assuming those runtime conditions will be in play.

In accordance with another aspect, there may be a file-specific analysis, in which some parsing/inspection technology may be associated with specific data types.

In accordance with example techniques discussed herein, a global analysis may be performed for each set of items discussed above. Thus, there may be a global pass over all applications declared in a package, looking for resources (e.g., which may be stored at the root level of the package) which no application has used (e.g., they may be effectively "dead"/unusable resources in this case). It may also be possible to perform an analysis based on analyzing multiple packages simultaneously, in accordance with example techniques discussed herein.

In accordance with example techniques discussed herein, file types may be identified. For example, such type identification may be extension driven, for example, determined via a file "sniffing" technique (in which a small portion of the file may be inspected to identify its format), etc.

In accordance with another aspect, content to be analyzed may be uploaded across the Internet/network, and results may be received asynchronously. In accordance with another aspect, a command-line driven analysis may be used.

For example, a user may click a "browse" button, which invokes a dialog that accepts one or more deployment packages. After building an upload list, the user may click "upload." For example, an email notification may be sent when analysis is complete. For example, the email may include a URL that references a web page that includes results. For example, the email may also include log files/results as an attachment.

In accordance with another aspect, the system 100 may crawl/analyze a large set of deployment packages, and may itself publish analysis results that may be relevant to a more global set. Such an example system may maintain a report of percentages of applications by language entry point, for example (e.g., 30% of packages have JavaScript entry points, 50% have MSIL entry points, and the remainder are C++).

One skilled in the art of data processing will appreciate that many different techniques may be used for acquiring packages, configuring the analysis, etc., without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 9A:
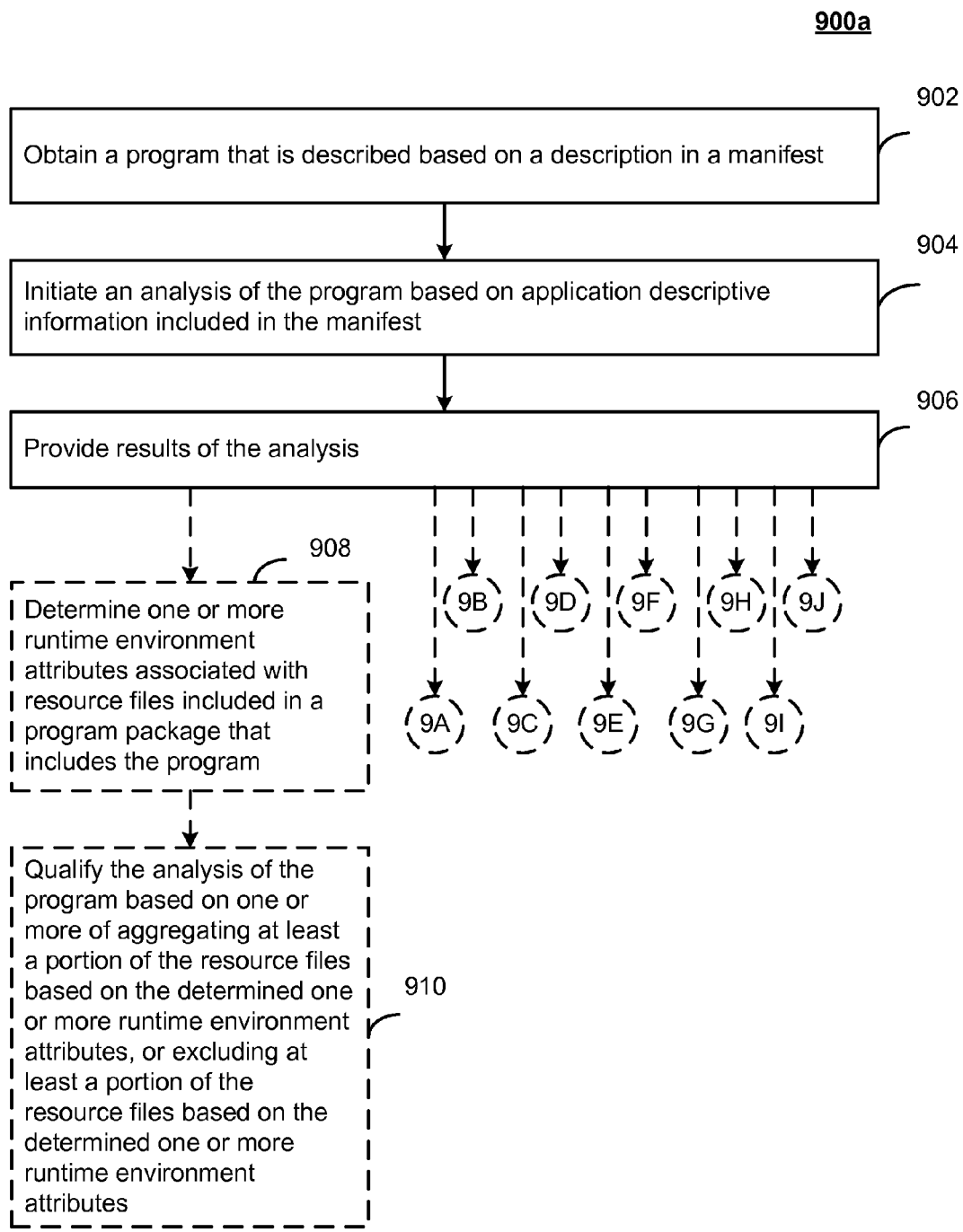
FIGS. 9a-9c are a flowchart illustrating example operations of the system of FIG. 1.

FIG. 9 is a flowchart illustrating example operations of the system of FIG. 1, according to example embodiments. In the example of FIG. 9a, a program that is described based on a description in a manifest may be obtained (902). For example, the program acquisition component may obtain the program 110 that is described based on a description 112 in a manifest 114, as discussed above.

An analysis of the program may be initiated based on application descriptive information included in the manifest (904). For example, the program analysis component 134 may initiate the analysis of the program 110 based on application descriptive information 136 included in the manifest 114, as discussed above.

Results of the analysis may be provided (906). For example, the results component 138 may provide results 140 of the analysis, as discussed above.

One or more runtime environment attributes associated with resource files included in a program package that includes the program may be determined (908). For example, the runtime environment attribute determination component 142 may determine one or more runtime environment attributes 144 associated with resource files 146 included in a program package 148 that includes the program 110, as discussed above.

The analysis of the program may be qualified based on one or more of aggregating at least a portion of the resource files based on the determined one or more runtime environment attributes, or excluding at least a portion of the resource files based on the determined one or more runtime environment attributes (910). For example, the runtime environment attribute qualification component 150 may qualify the analysis of the program 110 based on one or more of aggregating at least a portion of the resource files 146 based on the determined one or more runtime environment attributes 144, or excluding at least a portion of the resource files 146 based on the determined one or more runtime environment attributes 144, as discussed above.

Figure 9B:
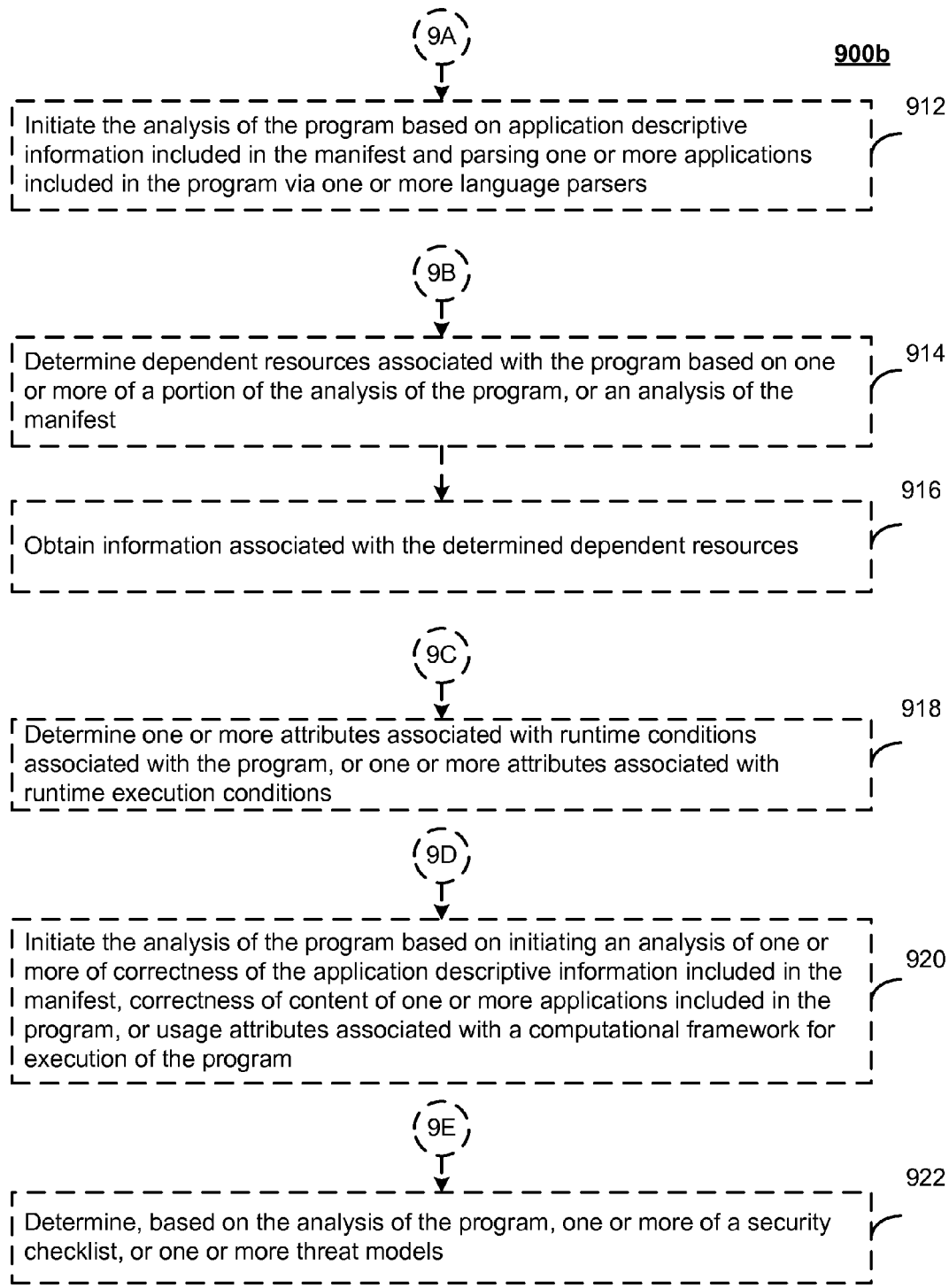

For example, the analysis of the program may be initiated based on application descriptive information included in the manifest and parsing one or more applications included in the program via one or more language parsers (912), in the example of FIG. 9b. For example, the program analysis component 134 may initiate the analysis of the program 110 based on the application descriptive information 136 included in the manifest 114 and parsing one or more applications 152 included in the program 110 via one or more language parsers 154, as discussed above.

For example, dependent resources associated with the program may be determined based on one or more of a portion of the analysis of the program, or an analysis of the manifest (914). For example, the dependent resource determination component 156 may determine dependent resources 158 associated with the program 110, as discussed above.

For example, information associated with the determined dependent resources may be obtained (916). For example, the dependent resource acquisition component 160 may obtain information associated with the determined dependent resources 158, as discussed above.

For example, declared permissions and one or more attributes associated with runtime behaviors of the program may be determined (918). For example, the manifest analysis component 162 may determine one or more of one or more attributes associated with runtime conditions associated with the program, or one or more attributes associated with runtime execution conditions, as discussed above.

For example, the analysis of the program may be initiated based on initiating an analysis of one or more of correctness of the application descriptive information included in the manifest, correctness of content of one or more applications included in the program, or usage attributes associated with a computational framework for execution of the program (920). For example, the program analysis component 134 may initiate the analysis of the program 110 based on initiating an analysis of one or more of correctness of the application descriptive information 136 included in the manifest 114, correctness of content of one or more applications 152 included in the program 110, or usage attributes associated with a computational framework for execution of the program 110, as discussed above.

For example, based on the analysis of the program, one or more of a security checklist, or one or more threat models may be determined (922). For example, the security analysis component 168 may determine, based on the analysis of the program 110, one or more of a security checklist 170, or one or more threat models 172, as discussed above.

Figure 9C:
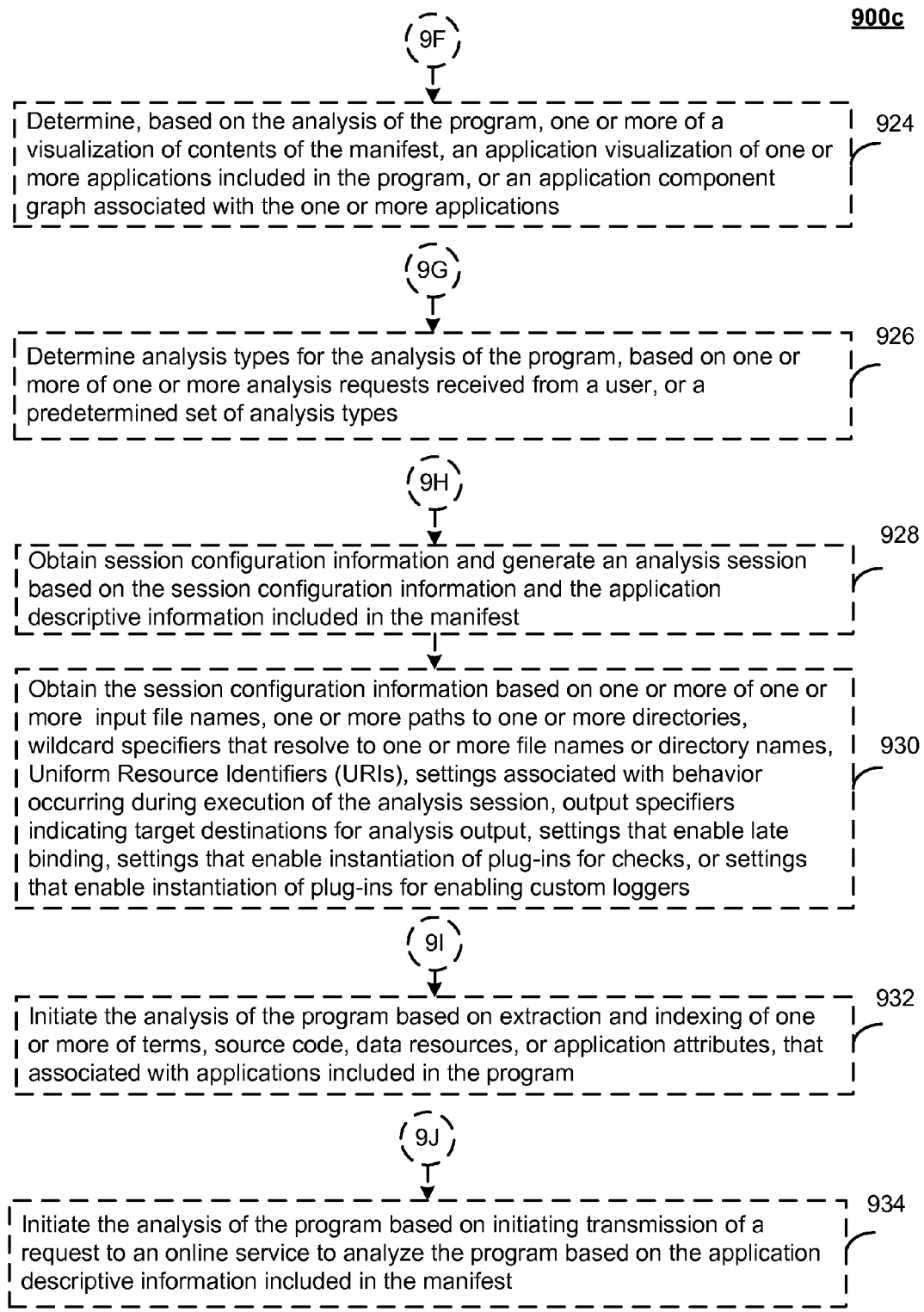

For example, based on the analysis of the program, one or more of a visualization of contents of the manifest, an application visualization of one or more applications included in the program, or an application component graph associated with the one or more applications may be determined (924), in the example of FIG. 9c. For example, the program analysis component 134 may determine, based on the analysis of the program 110, one or more of an application visualization 174 of one or more applications 152 included in the program 110, or an application component graph 176 associated with the one or more applications 152, as discussed above.

For example, one or more analysis types may be determined for the analysis of the program, based on one or more of one or more analysis requests received from a user, or a predetermined set of analysis types (926). For example, the analysis request component 178 may determine one or more analysis types 180 for the analysis of the program 110, based on one or more of one or more analysis requests 182 received from a user, or a predetermined set of analysis types 184, as discussed above.

For example, session configuration information may be obtained and an analysis session may be generated based on the session configuration information and the application descriptive information included in the manifest (928). For example, the session determination component 186 may obtain session configuration information 188 and generate an analysis session based on the session configuration information 188 and the application descriptive information 136 included in the manifest 114, as discussed above.

For example, the session configuration information may be obtained based on one or more of one or more input file names, one or more paths to one or more directories, wildcard specifiers that resolve to one or more file names or directory names, Uniform Resource Identifiers (URIs), settings associated with behavior occurring during execution of the analysis session, output specifiers indicating target destinations for analysis output, settings that enable late binding, settings that enable instantiation of plug-ins for checks, or settings that enable instantiation of plug-ins for enabling custom loggers (930). For example, the session determination component 186 may obtain the session configuration information 188, as discussed above.

For example, the analysis of the program may be initiated based on extraction and indexing of one or more of terms, source code, data resources, or application attributes, that may be associated with applications included in the program (932). For example, the program analysis component 134 may initiate the analysis of the program 110 based on the extraction and indexing, as discussed above.

For example, the analysis of the program may be initiated based on initiating transmission of a request to an online service to analyze the program based on the application descriptive information included in the manifest (934). For example, the program analysis component 134 may initiate the analysis of the program 110 based on initiating transmission of a request to an online service to analyze the program 110 based on the application descriptive information 136 included in the manifest 114, as discussed above.

Figure 10A:
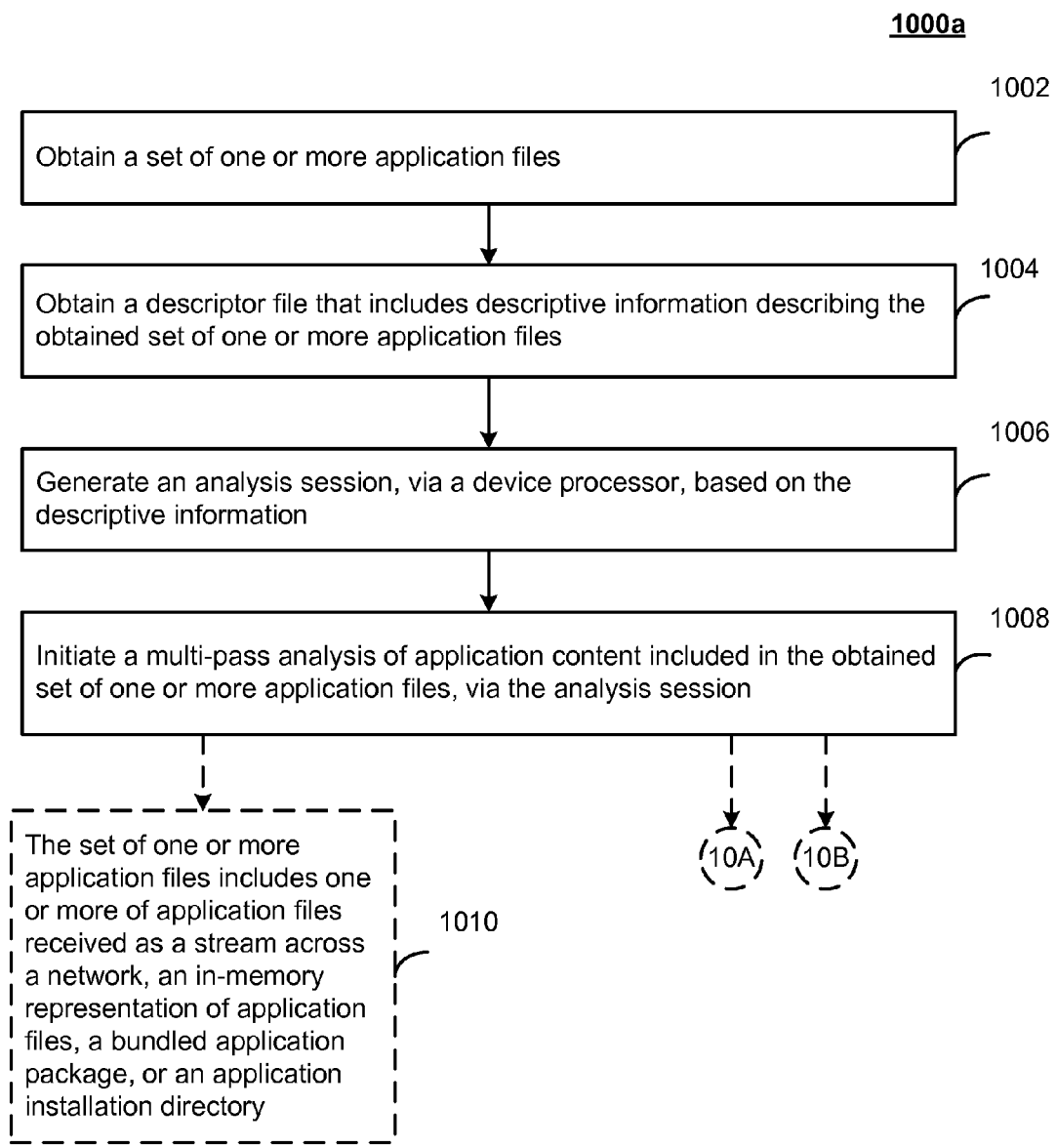
FIGS. 10a-10b are a flowchart illustrating example operations of the system of FIG. 1.

FIG. 10 is a flowchart illustrating example operations of the system of FIG. 1, according to example embodiments. In the example of FIG. 10a, a set of one or more application files may be obtained (1002). A descriptor file that includes descriptive information describing the obtained set of one or more application files may be obtained (1004). For example, the program acquisition component may obtain the program 110 that is described based on a description 112 in a manifest 114, as discussed above.

An analysis session may be generated, via a device processor, based on the descriptive information (1006). For example, the session determination component 186 may generate the analysis session based on the application descriptive information 136, as discussed above.

A multi-pass analysis of application content included in the obtained set of one or more application files may be initiated, via the analysis session (1008).

For example, the set of one or more application files may include one or more of application files received as a stream across a network, an in-memory representation of application files, a bundled application package, or an application installation directory (1010). For example, a deployment package may be received as a stream across a network, and may be parsed substantially entirely in memory.

Figure 10B:
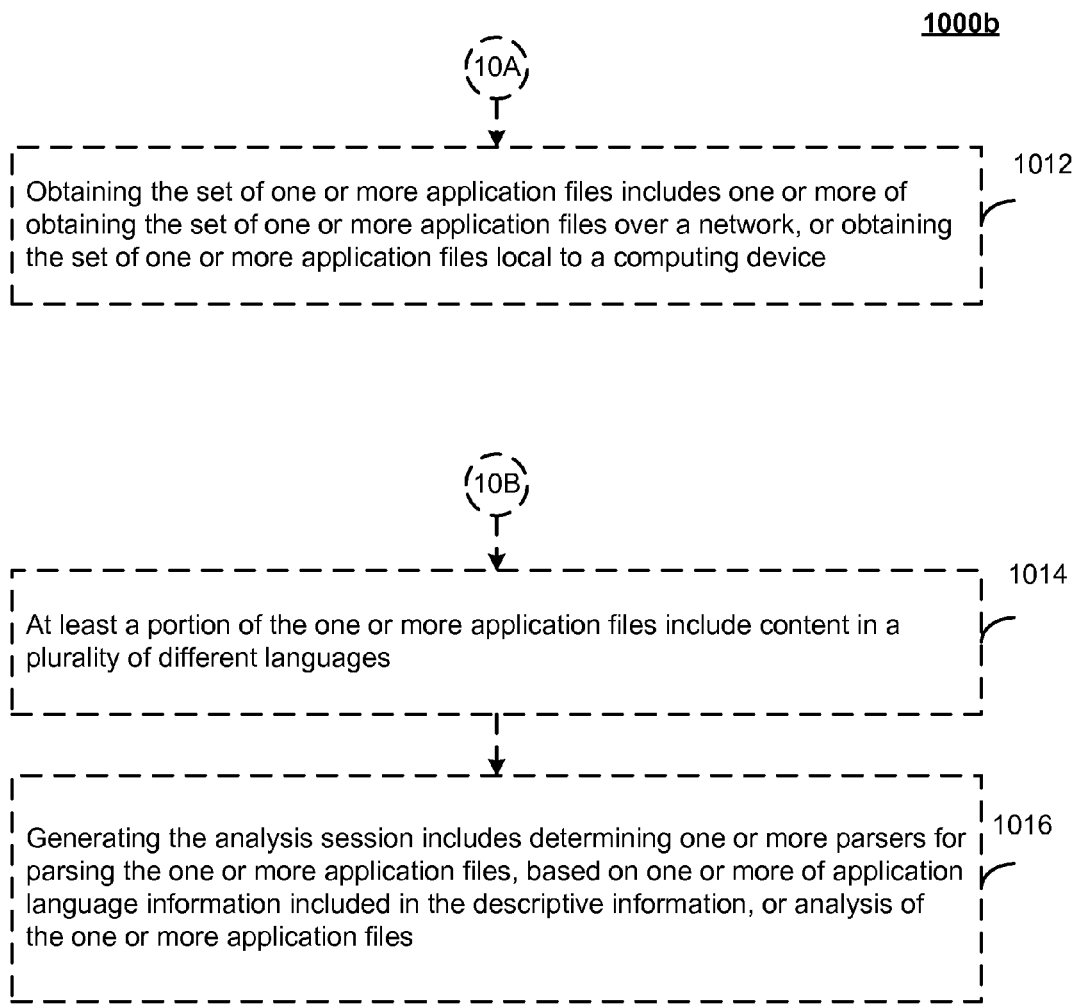

For example, obtaining the set of one or more application files may include one or more of obtaining the set of one or more application files over a network, or obtaining the set of one or more application files local to a computing device (1012), in the example of FIG. 10b.

At least a portion of the one or more application files may include content in a plurality of different languages (1014).

For example, generating the analysis session may include determining one or more parsers for parsing the one or more application files, based on one or more of application language information included in the descriptive information, or analysis of the one or more application files (1016). For example, the program analysis component 134 may initiate the analysis of the program 110 based on parsing one or more applications 152 via one or more language parsers 154, as discussed above.

Figure 11:
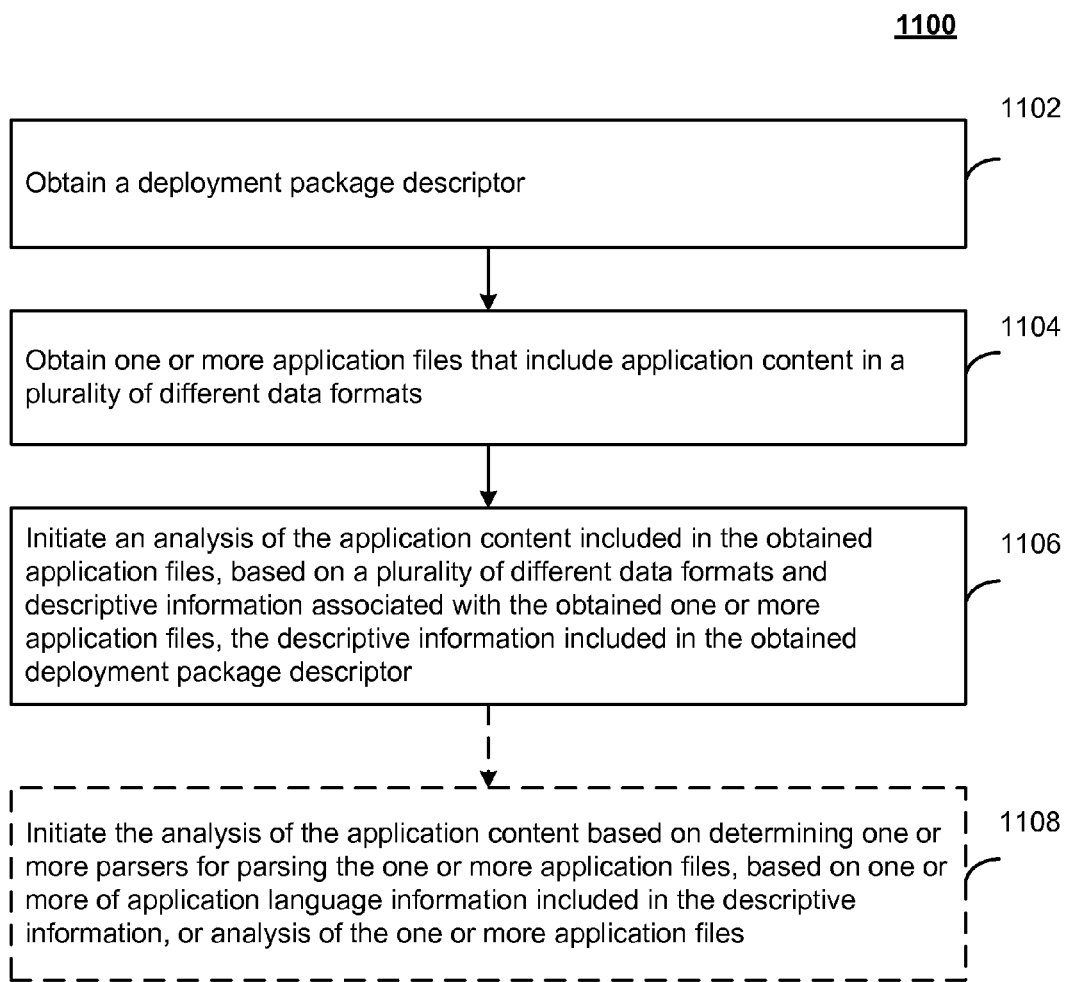
FIG. 11 is a flowchart illustrating example operations of the system of FIG. 1.

FIG. 11 is a flowchart illustrating example operations of the system of FIG. 1, according to example embodiments. In the example of FIG. 11a, a deployment package descriptor may be obtained (1102). One or more application files that include application content in a plurality of different data formats may be obtained (1104). For example, the program acquisition component may obtain the program 110 that is described based on a description 112 in a manifest 114, as discussed above.

An analysis of the application content included in the obtained one or more application files may be initiated, based on a plurality of different data formats and descriptive information associated with the obtained one or more application files, the descriptive information included in the obtained deployment package descriptor (1106). For example, the program analysis component 134 may initiate the analysis of the program 110 based on the application descriptive information 136 and parsing one or more applications 152 via one or more language parsers 154, as discussed above.

The analysis of the application content may be initiated based on determining one or more parsers for parsing the one or more application files, based on one or more of application language information included in the descriptive information, or analysis of the one or more application files (1108). For example, the program analysis component 134 may initiate the analysis of the program 110 based on the application descriptive information 136 and parsing one or more applications 152 included in the program 110 via one or more language parsers 154, as discussed above.

One skilled in the art of data processing will understand that there may be many ways of analyzing programs based on descriptor file information, without departing from the spirit of the discussion herein.

Customer privacy and confidentiality have been ongoing considerations in data processing environments for many years. Thus, example techniques for analyzing programs may use user input and/or data provided by users who have provided permission via one or more subscription agreements (e.g., "Terms of Service" (TOS) agreements) with associated applications or services associated with such analysis. For example, users may provide consent to have their input/data transmitted and stored on devices, though it may be explicitly indicated (e.g., via a user accepted agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A device that analyzes program packages of applications, the device comprising:
   at least one processor, and
   a memory storing instructions that, when executed by the at least one processor, provide a static program analysis system comprising:
      a program acquirer that stores a program package comprising:
         a set of program resources; and
         a manifest that describes deployment of the respective program resources for the application;
      a static program analysis engine that performs a static program analysis of the application comprising:
         a first pass over the program package that:
            using the manifest, identifies dependencies of the respective program resources upon respective dependency targets involving other program resources of the program package, and
            generates a program resource dependency model that describes the dependencies among the respective program resources of the program package; and
         a second pass, following the first pass, that uses the program resource dependency model to discover runtime dependency issues arising at runtime among the program resources of the program package, wherein the runtime dependency issues are irrespective of resources not provided by the program package that may or may not exist on a target device upon which the program package is installed; and
      a results presenter that presents, to a user, the results of the static program analysis, including diagnostic messages that describe the runtime dependency issues discovered during the second pass of the static program analysis.

2. The device of claim 1, wherein: the system further comprises: a runtime environment attribute determiner that determines one or more runtime environment attributes associated with resource files included in the program package; and the static program analysis engine uses the runtime environment attributes determined by the runtime environment attribute determiner to identify the dependencies of the respective program resources upon respective dependency targets.

3. The device of claim 2, wherein the static program analysis engine using the runtime environment attributes further comprises one or more of:
   aggregating at least a portion of the resource files based on the determined one or more runtime environment attributes, and
   excluding at least a portion of the resource files based on the determined one or more runtime environment attributes.

4. The device of claim 1, wherein:
   a first program resource of the program package is authored in a different language than a second program resource of the program package; and
   the static program analysis engine discovers the runtime dependency issues arising at runtime among the program resources of the program package by, for the respective program resources:
      identifying the program resource language of the program resource; and
      invoking a program resource parser for the program resource language to discover the runtime dependency issues of the program resource arising at runtime.

5. The device of claim 1, wherein:
   the static program analysis engine further discovers additional issues including at least one of:
      correctness of the application descriptive information included in the manifest,
      correctness of content of one or more applications included in the application, and
      usage attributes associated with a computational framework for execution of the application; and
   the results presenter further presents additional diagnostic messages that describe the additional issues discovered by the static program analysis engine.

6. The device of claim 1, wherein the results presenter presents the results of the static program analysis as one or more of:
   a visualization of contents of the manifest,
   an application visualization of the application included in the program, and
   an application component graph associated with the application.

7. The device of claim 1, wherein the static program analysis engine chooses one or more analysis types for the analysis of the program package, based on one or more of:
   one or more analysis requests received from the user, and
   a predetermined set of analysis types.

8. The device of claim 1, wherein the static program analysis engine performs the static program analysis using session configuration information based on one or more of:
   settings associated with behavior occurring during execution of the analysis session,
   output specifiers indicating target destinations for analysis output, settings that enable late binding,
settings that enable instantiation of plug-ins for checks, and
settings that enable instantiation of plug-ins for enabling custom loggers.

9. The device of claim 1, wherein the static program analysis engine initiates the static program analysis of the program package based on extraction and indexing of one or more of:
terms,
source code,
data resources, and
application attributes,
that are associated with the application.

10. The device of claim 1, wherein the static program analysis engine performs the static program analysis of the program package by initiating transmission of a request to an online service to analyze the program package based on the manifest.

11. A method of analyzing program packages of applications using a device having a processor, the method comprising:
executing, on the processor, instructions that cause the device to:
obtain a program package comprising:
a set of program resources; and
a manifest that describes deployment of the respective program resources for the application;
perform a static program analysis of the application comprising:
a first pass over the program package that:
using the manifest, identifies dependencies of the respective program resources upon respective dependency targets involving other program resources of the program package, and
generates a program resource dependency model that describes the dependencies of the respective program resources; and
a second pass, following the first pass, that uses the program resource dependency model to discover runtime dependency issues arising at runtime among the program resources of the program package, wherein the runtime dependency issues are irrespective of resources not provided by the program package that may or may not exist on a target device upon which the program package is installed; and
results of the static program analysis, including diagnostic messages that describe the runtime dependency issues discovered during the second pass of the static program analysis.

12. The method of claim 11, wherein:
the program resources of the program package include one or more of:
application files received as a stream across a network,
an in-memory representation of application files,
a bundled application package, or
an application installation directory.

13. A computer program product comprising a hardware computer-readable storage medium storing executable code that, when executed, causes at least one data processing apparatus to analyze program packages by:
obtaining a program package comprising:
a set of program resources; and
a manifest that describes deployment of the respective program resources for the application;
performing a static program analysis of the application comprising:
a first pass over the program package that:
using the manifest, identifies dependencies of the respective program resources upon respective dependency targets involving other program resources of the program package, and
generates a program resource dependency model that describes the dependencies among the respective program resources of the program package; and
a second pass, following the first pass, that uses the program resource dependency model to discover runtime dependency issues arising at runtime among the program resources of the program package, wherein the runtime dependency issues are irrespective of resources not provided by the program package that may or may not exist on a target device upon which the program package is installed; and
presenting, to a user, results of the static program analysis, including diagnostic messages that describe the runtime dependency issues discovered during the second pass of the static program analysis.

14. The device of claim 1, wherein the static program analysis engine identifies the dependencies of the respective program resources upon respective dependency targets by:
identifying a first program resource of the program package that comprises an application entry point for execution of the application;
identifying other program resources of the program package as dependency targets of the first program resource at runtime; and
recursively identifying, for the respective other program resources, additional program resources dependency as dependency targets of the other program resource at runtime.

15. The device of claim 14, wherein the static program analysis engine completes the first pass and the second pass to a first level of the program resources of the program package before applying the first pass and the second pass to a second level of the program resources of the program package.

16. The device of claim 1, wherein the static program analysis engine identifies the dependencies of the respective program resources upon respective dependency targets by:
identifying, within a first program resource of the program package, a call to a call site within a second program resource of the program package; and
identifying the second program package as a dependency target of the first program resource.

17. The device of claim 1, wherein:
the static program analysis engine further discovers, among the program resources of the program package, a selected program resource that is not a dependency target for any other program resource; and
the results presenter further presents additional diagnostic messages that identify the selected program resource as an unused program resource of the application.

18. The device of claim 1, wherein:
a selected program resource has an external dependency target that is external to the program package;
the static program analysis engine further verifies the external dependency target of the selected program resource; and
the results presenter further presents additional diagnostic messages that identify a result of verifying the external dependency target of the selected program resource.

19. The device of claim 4, wherein:

the static program analysis engine further tracks, for respective languages, a usage of the language among the program resources of the program package; and the results presenter further presents additional diagnostic messages that identify, for the respective languages, the usage of the language among the program resources of the program package.

20. The device of claim 1, wherein:

the respective program resources of the program package are associated with a locale;

the static program analysis engine chooses one or more analysis types for the analysis of the program package, based on an analysis request received from the user that specifies a selected locale; and the static program analysis engine further limits the static program analysis to the program resources of the program package that are associated with the selected locale specified by the user.

* * * * *